United States Patent
Charbonnier et al.

(10) Patent No.: US 11,841,938 B2
(45) Date of Patent: Dec. 12, 2023

(54) METHOD FOR ACTIVATING SENSORS IN A MULTI-UNIT DEVICE

(71) Applicant: THALES DIS FRANCE SAS, Meudon (FR)

(72) Inventors: Sylvain Charbonnier, Meudon (FR); Philippe Loubet Moundi, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/046,964

(22) PCT Filed: Apr. 9, 2019

(86) PCT No.: PCT/EP2019/058903
§ 371 (c)(1),
(2) Date: Oct. 12, 2020

(87) PCT Pub. No.: WO2019/197377
PCT Pub. Date: Oct. 17, 2019

(65) Prior Publication Data
US 2021/0049261 A1 Feb. 18, 2021

(30) Foreign Application Priority Data
Apr. 12, 2018 (EP) ..................... 18305451

(51) Int. Cl.
*G06F 21/52* (2013.01)
*G06F 21/55* (2013.01)

(52) U.S. Cl.
CPC ............ *G06F 21/52* (2013.01); *G06F 21/554* (2013.01); *G06F 2221/033* (2013.01)

(58) Field of Classification Search
CPC ... G06F 21/52; G06F 21/554; G06F 2221/033
See application file for complete search history.

(56) References Cited

U.S. PATENT DOCUMENTS

2006/0269312 A1* 11/2006 Muraishi ............... H02J 7/0016
399/88
2017/0357829 A1* 12/2017 Park ........................ G06F 21/86
(Continued)

OTHER PUBLICATIONS

PCT/EP2019/058903, International Search Report, dated Apr. 24, 2019, European Patent Office, P.B.5818 Patentlaan 2 NL-2280 HV Rijswijk.

(Continued)

*Primary Examiner* — Ashokkumar B Patel
*Assistant Examiner* — William B Jones

(57) ABSTRACT

The present invention relates to a method for activating at least one sensor among a plurality of sensors embedded in a multi-unit device, said at least one sensor being configured to detect attacks during an execution by said multi-unit device of a software code comprising computer code instructions, wherein: said multi-unit device comprises at least two code execution units and a sensor activation circuit, and each sensor is associated to one code execution unit, and said method comprising, performed by said sensor activation circuit before execution of a computer code instruction of said software code by one of said code execution units: —determining (S1) the code execution unit configured to execute said instruction, —activating (S2) only the sensors associated with the determined code execution unit.

21 Claims, 1 Drawing Sheet

(56) References Cited

U.S. PATENT DOCUMENTS

2018/0097825 A1* 4/2018 Pavlas ................. G06F 11/0751
2018/0122235 A1* 5/2018 Hanks ................... G08G 1/162

OTHER PUBLICATIONS

EP18305451, European Search Report, dated Oct. 15, 2018, The Hague.

* cited by examiner

METHOD FOR ACTIVATING SENSORS IN A MULTI-UNIT DEVICE

FIELD OF THE INVENTION

The present invention relates to the field of chip protection against attacks, and more particularly to a method and a corresponding device enabling a hardware activation of the security sensors of a calculation unit only when it executes software code.

BACKGROUND OF THE INVENTION

Computer systems are commonly used for performing operations on sensitive data, such as encryption or decryption operations. Attacks, such as fault attacks, have been designed by which an attacker may gain access to such sensitive data, for example by disturbing the execution of a software code by a processing chip in order to make it produce execution errors.

In order to protect processing chips and the sensitive data they process against such attacks, security sensors are embedded in processing devices. Such sensors monitor the behavior and environment of a processing device in order to detect a faulty behavior that would probably result from an attack. When such an attack is detected, they can take action preventing an attacker from getting access to sensitive data, for example by triggering the activation of counter measures.

A drawback of using such sensors is that the higher their sensitivity is, the higher the probability of false positive detection leading to countermeasure activation while no attack is ongoing. This can be a problem since countermeasure can go up to killing a process or resetting a device. Consequently solutions have been sought in order to minimize the risk of false positive detection. An existing solution is to control sensors activation and deactivation by software and to insert in the software code to be executed by a chip commands activating and deactivating the security sensors of that chip. Such a solution has numerous drawbacks: it increases the software code size, decreases its readability, it requires software engineers to insert manually commands in their code, it may result in computations performed without the required security sensors activated or on the other hand security sensors activated while unneeded when one or more activation/deactivation commands are not properly inserted in a software code to be executed.

Consequently, there is a need of a method enabling to activate security sensors of a chip only when they are needed, that is to say only when the chip executes software code, with no impact on the software code to be executed itself.

SUMMARY OF THE INVENTION

For this purpose and according to a first aspect, this invention therefore relates to a method for activating at least one sensor among a plurality of sensors embedded in a multi-unit device, said at least one sensor being configured to detect attacks during an execution by said multi-unit device of a software code comprising computer code instructions, wherein:
said multi-unit device comprises at least two code execution units and a sensor activation circuit, and
each sensor is associated to one code execution unit,
and said method comprising, performed by said sensor activation circuit before execution of a computer code instruction of said software code by one of said code execution units:
determining the code execution unit configured to execute said instruction,
activating only the sensors associated with the determined code execution unit.

By doing so, the sensors which are protecting a code execution unit are activated only just before it executes some software code. In addition, such a solution has no impact on the software code itself.

The method according to the first aspect may also comprise, performed by said sensor activation circuit, triggered by completion of execution of said computer code instruction, deactivating said sensors associated with the determined code execution unit.

By doing so the sensors of a code execution unit are disabled once the code execution unit is not used anymore for performing computations. As a result, the sensors of a code execution unit remain activated only when necessary, only while the code execution unit executes software code.

The step of determining the code execution unit configured to execute said instruction may comprise sensing activation of the code execution unit.

Said multi-unit device comprising a memory, the step of determining the code execution unit configured to execute said instruction may comprise sensing a memory access to a specific range of memory addresses of said memory dedicated to said code execution unit.

The step of determining the code execution unit configured to execute said instruction may comprise sensing providing a clock signal to the code execution unit.

It enables to predict which code execution unit is going to execute the software before it executes its first instruction, thanks to which sensors may be activated before the execution.

The method according to the first aspect may comprise waiting a predetermined delay after completion of execution of said computer code instruction before switching off a sensor.

It enables to avoid switching of sensors of a code execution unit after each execution of an instruction if the unit is going to execute another instruction right after.

According to a second aspect, this invention relates to a computer program product directly loadable into the memory of at least one computer, comprising software code instructions for performing the steps of the method according to the first aspect of the invention when said product is run on the computer.

According to a third aspect, this invention relates to a multi-unit device comprising:
a plurality of sensors,
at least two code execution units,
and a sensor activation circuit,
said sensors being configured to detect attacks during an execution by said multi-unit device of a software code comprising computer code instructions, and,
each sensor being associated to one code execution unit and, said sensor activation circuit being configured for performing, before execution of a computer code instruction of said software code by one of said code execution units, the steps of the method according to the first aspect.

Each code execution unit may be among a CPU core or a co-processor.

Said multi-unit device may be among a multi-core CPU or GPU, a system on chip or the chip of a smart card.

Said sensors may be among temperature sensors, glitch sensors, voltage sensors, light sensors, frequency sensors, current sensors, digital integrity sensors.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at activating the sensors embedded in a multi-unit device only when it is useful, that is to say when the circuits they are protecting are being used for performing a calculation.

Figure 1:
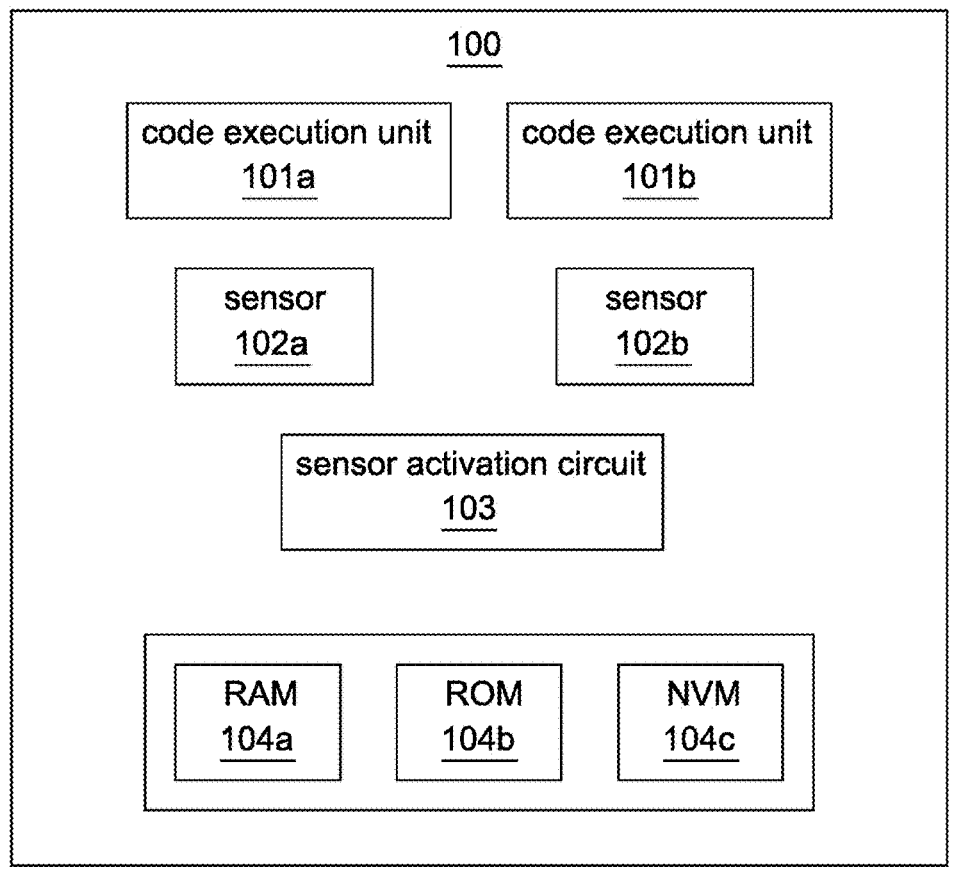
FIG. 1 is a schematic illustration of a multi-unit device according to the present invention.

FIG. 1 shows such a multi-unit device 100 according to the invention. It includes at least two code execution units 101a, 101b . . . and a plurality of sensors 102a, 102b . . . . Such a multi-unit device may for example by a multi-core CPU or GPU, or a System-On-Chip (SoC), or the chip of a smartcard, also called secure element. Code execution units may for example be CPU cores or co-processors.

The multi-unit device 100 also includes a plurality of sensors 102a, 102b . . . . Such sensors are configured to detect attacks that may happen during an execution by the multi-unit device of a software code comprising computer code instructions. Each sensor may be associated to one code execution unit. Such sensors may for example be temperature sensors, glitch sensors, voltage sensors, light sensors, frequency sensors, current sensors, digital integrity sensors . . . .

The multi-unit device 100 also includes a sensor activation circuit 103. It is a hardware circuit that is in charge of the activation and deactivation of the sensors when the code execution unit they are associated to is being used or unused. It may be a dedicated circuit, or it may be a circuit having other functions in the multi-unit device, such as memory access management or bus management.

The multi-unit device 100 also includes at least one memory 104 including a random access memory (RAM) 104a, a read-only memory (ROM) 104b, and/or a non-volatile memory (NVM) 104c.

Figure 2:
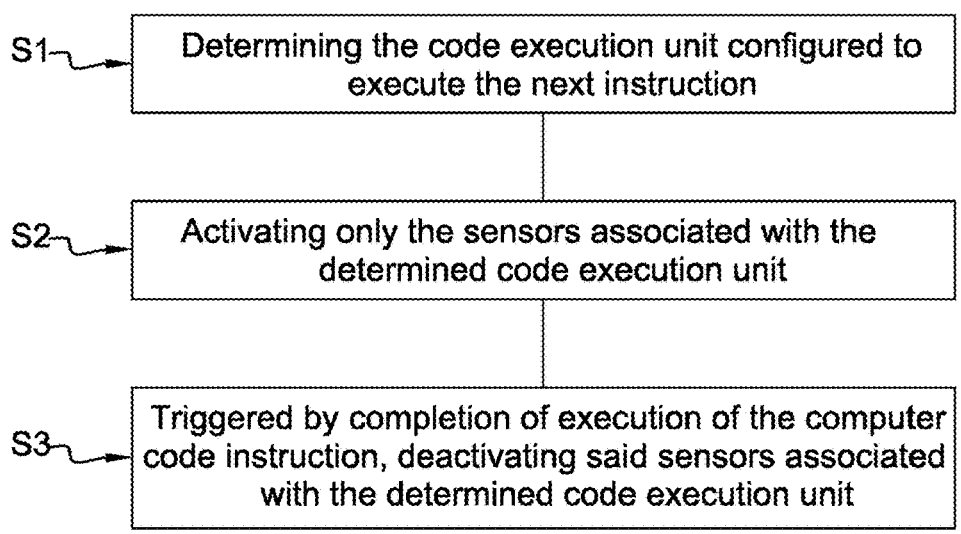
FIG. 2 is a schematic illustration of a method for activating at least one sensor among a plurality of sensors embedded in a multi-unit device according to an embodiment of the present invention.

More precisely, the invention relates to a method for activating at least one sensor among the plurality of sensors embedded in the multi-unit device. The steps of this method, depicted on FIG. 2 and described here after, are performed by the sensor activation circuit before the execution of a computer code instruction of the software code by a code execution unit of the multi-unit device.

In a first step S1, the sensor activation circuit determines the code execution unit which is configured to execute said instruction.

In a second step S2, the sensor activation circuit activates only the sensors associated with the determined code execution unit.

By doing so, the sensors which are protecting a code execution unit are activated only just before it executes some software code. They are not activated too far in advance in order to avoid spurious attack detection while the code execution unit is not performing any calculation. In addition, such a solution has no impact on the software code itself. Since sensors activation in performed by the sensor activation circuit on its own, there is no need to add any additional instruction related to sensors activation in the software code.

The method according to the invention may comprise a third step S3 also performed by the sensor activation circuit, which is triggered by the completion of the execution of a computer code instruction, during which the sensor activation circuit deactivates the sensors associated with the code execution unit determined at the first step S1. Such a completion may for example be indicated by a signal returned by the code execution unit, by a state change of the code execution unit to an idle state or by a change in a clock signal provided to the code execution unit. By doing so the sensors of a code execution unit are disabled once the code execution unit is not used anymore for performing computations.

As a result, the sensors of a code execution unit remain activated only when necessary, only while the code execution unit executes software code.

During the first step S1, determining the code execution unit configured to execute said instruction may be performed by the sensor activation circuit by sensing an activation of the code execution unit.

For example, such an activation may be detected by sensing that a clock signal is provided to the code execution unit by a clock circuit, by detecting a chip select signal directed to the code execution unit or by monitoring a state of the execution unit and detecting that the code execution unit is not in an idle state or energy-saving state anymore.

In another embodiment the sensor activation circuit determines the code execution unit configured to execute an instruction by sensing a memory access to a specific range of memory addresses of the memory 104 of the multi-unit device dedicated to a specific code execution unit. Such a memory access may indeed reveal a reading in the memory of data used as an input to a computation to be performed by the code execution unit.

In order to avoid deactivating the sensors of a code execution unit after each computation when the same execution unit performs several executions of instructions one after the other, the sensor activation circuit may wait a predetermined delay after the completion of execution of a computer code instruction before switching off any sensor. If the code execution units starts performing a new computation before the delay has elapsed, the sensors of the code execution unit shall not be deactivated anymore and the sensor activation unit may reset the countdown, wait for the code execution unit to stop executing instructions, and then wait again the predetermined delay before deactivating the sensors.

According to a second aspect, the invention relates to a computer program product directly loadable into the memory of at least one computer, comprising software code instructions for performing, when said product is run on the computer, the steps of the method described here before.

According to a third aspect, the invention relates to the multi-unit device described here before comprising:
- a plurality of sensors 102a, 102b . . . ,
- at least two code execution units 101a, 101b . . . ,
- and a sensor activation circuit 103, said sensors being configured to detect attacks during an execution by said multi-unit device of a software code comprising computer code instructions, and, each sensor being associated to one code execution unit and, said sensor activation circuit 103 being configured for performing, before execution of a computer code instruction of said software code by one of said code execution units, the steps of the method described here before.

In addition to these features, the computer program according to the second aspect of the invention and the multi-unit device according to the third aspect of the invention may be configured for performing or may comprise any other features described here before.

Therefore, the proposed method and systems enable to activate the sensors of the code execution units of the multi-unit device only when they are needed, activating the sensors of an execution unit only during the execution by this unit of software code manipulating data to be protected, and without requiring any modification of the software code itself.

The invention claimed is:

1. A method for activating at least one sensor among a plurality of sensors embedded in a multi-unit device having a software code comprising computer code instructions, wherein:
said multi-unit device comprises at least two code execution units each operable to execute at least a portion of said software code and a sensor activation circuit, and each sensor is associated to one code execution unit,
and said method comprising: before execution of a computer code instruction of said software code by one of said code execution units:
detecting, by said sensor activation circuit, the code execution unit configured to execute said computer code instruction of said software code, and
activating, by said sensor activation circuit, only the sensors associated with said detected code execution unit.

2. The method of claim 1 comprising, performed by said sensor activation circuit, triggered by completion of execution of said computer code instruction, deactivating said sensors associated with the detected execution unit.

3. The method of claim 2, comprising waiting to switch off a sensor for a predetermined delay-period after completion of execution of said computer code instruction.

4. The method of claim 1, wherein the step of detecting the code execution unit configured to execute said computer code instruction comprises sensing activation of the code execution unit.

5. The method of claim 1, wherein said multi-unit device comprises a memory and the step of detecting the code execution unit configured to execute said computer code instruction comprises sensing a memory access to a specific range of memory addresses of said memory dedicated to said code execution unit.

6. The method of claim 1, wherein the step of detecting the code execution unit configured to execute said computer code instruction comprises sensing providing a clock signal to the code execution unit.

7. A non-transitory computer readable memory storing a computer program product comprising sensor activation circuit instructions, executable by a sensor activation circuit of a multi-unit device having a software code comprising computer code instructions, said sensor activation circuit and at least two code execution units each operable to execute at least a portion of said software code, and a plurality of sensors, each sensor being associated to one code execution unit, wherein the computer program product comprises sensor activation instructions performed by said sensor activation circuit before execution of a computer code instruction of said software code executed by one of said code execution units and directing the sensor activation circuit to:
detect the code execution unit configured to execute said computer code instruction of said software code, and
activate only the sensors associated with the detected code execution unit.

8. The non-transitory computer readable memory of claim 7 wherein the computer program product instructions executable by the sensor activation circuit, further comprise:
sensor activation circuit instructions, triggered by completion of execution of said computer code instruction by said detected code execution unit, to direct said sensor activation circuit to deactivate said sensors associated with the detected code execution unit.

9. The non-transitory computer readable memory of claim 8 wherein the computer program product further comprises sensor activation circuit instructions to wait a predetermined delay after completion of execution of said computer code instruction before switching off a sensor.

10. The non-transitory computer readable memory of claim 7 wherein instructions for detecting the code execution unit configured to execute said computer code instruction comprises sensing activation of the code execution unit.

11. The non-transitory computer readable memory of claim 7 wherein said multi-unit device comprises a memory and the step of detecting the code execution unit configured to execute said computer code instruction comprises sensing a memory access to a specific range of memory addresses of said memory dedicated to said code execution unit.

12. The non-transitory computer readable memory of claim 7 wherein the step of detecting the code execution unit configured to execute said computer code instruction comprises sensing provisioning of a clock signal to the code execution unit.

13. A multi-unit device comprising:
a software code,
a plurality of sensors, at least two code execution units each operable to execute at least a portion of said software code, and a sensor activation circuit, where in each sensor being associated to one code execution unit and, said sensor activation circuit being configured for performing, before execution of a computer code instruction of said at least a portion of said software code by one of said code execution units, the steps of:

detecting the code execution unit configured to execute said instruction of said at least a portion of said software code, and activating only the sensors associated with said detected code execution unit.

14. The multi-unit device of claim 13, wherein each code execution unit is among a CPU core or a co-processor.

15. The multi-unit device of claim 13, said multi-unit device being among a multi-core CPU or GPU, a system on chip or the chip of a smart card.

16. The multi-unit device of claim 13, wherein sensors are among temperature sensors, glitch sensors, voltage sensors, light sensors, frequency sensors, current sensors, digital integrity sensors.

17. The multi-unit device of claim 13 wherein the sensor activation circuit is further configured to deactivate said sensors associated with the detected code execution unit upon completion of execution of said computer code instruction by said detected execution unit.

18. The multi-unit device of claim 17 wherein the software code further comprises instructions to wait a predetermined delay after completion of execution of said computer code instruction before switching off a sensor.

19. The multi-unit device of claim 13 wherein the step of detecting the code execution unit configured to execute said instruction comprises sensing activation of the code execution unit.

20. The multi-unit device of claim 13 wherein said multi-unit device comprises a memory and the instructions for detecting the code execution unit configured to execute said instruction comprises code for sensing a memory access to a specific range of memory addresses of said memory dedicated to said code execution unit.

21. The multi-unit device of claim 13 wherein the instructions for detecting the code execution unit configured to execute said instruction comprises sensing providing a clock signal to the code execution unit.

* * * * *